United States Patent
Matula et al.

(10) Patent No.: US 9,257,117 B2
(45) Date of Patent: Feb. 9, 2016

(54) SPEECH ANALYTICS WITH ADAPTIVE FILTERING

(71) Applicant: Avaya, Inc., Basking Ridge, NJ (US)

(72) Inventors: Valentine C. Matula, Granville, OH (US); Shmuel Shaffer, Palo Alto, AZ (US)

(73) Assignee: Avaya Inc., Basking Ridge, NJ (US)

( * ) Notice: Subject to any disclaimer, the term of this patent is extended or adjusted under 35 U.S.C. 154(b) by 50 days.

(21) Appl. No.: 14/172,297

(22) Filed: Feb. 4, 2014

(65) Prior Publication Data
US 2015/0221299 A1    Aug. 6, 2015

(51) Int. Cl.
| | |
|---|---|
| G10L 15/00 | (2013.01) |
| G10L 15/08 | (2006.01) |
| G10L 25/48 | (2013.01) |
| H04M 3/51 | (2006.01) |

(52) U.S. Cl.
CPC ............... *G10L 15/08* (2013.01); *G10L 25/48* (2013.01); *H04M 3/5175* (2013.01)

(58) Field of Classification Search
CPC ....... G10L 15/08; G10L 25/48; H04M 3/5175
USPC .............. 704/4, 207, 211, 226, 239, 246, 251
See application file for complete search history.

(56) References Cited

U.S. PATENT DOCUMENTS

| | | | |
|---|---|---|---|
| 7,598,975 B2* | 10/2009 | Cutler | ................ G06K 9/00295 348/14.06 |
| 2010/0296417 A1 | 11/2010 | Steiner | |
| 2014/0247926 A1* | 9/2014 | Gainsboro et al. | ......... 379/88.01 |
| 2015/0074189 A1* | 3/2015 | Cox | .................... H04L 12/1822 709/204 |

OTHER PUBLICATIONS

"Speech Analytics", NICE, Jul. 12, 2013, 1 page, retrieved from http://www.nice.com/cross-channel-analytics/speech-analytics.
"A Phonemic Restoration Approach for Automatic Speech Recognition with Highly Nonstationary Background Noise", Lee and Hasegawa-Johnson, Jul. 12, 2013, 4 pages, retrieved from http://citeseerx.ist.psu.edu/viewdoc/download?doi=10.1.1.150.8189&rep=rep1&type=pdf.

(Continued)

*Primary Examiner* — Marcellus Augustin
(74) *Attorney, Agent, or Firm* — Sheridan Ross P.C.

(57) ABSTRACT

Contact center agents often work in close proximity to other agents. As a primary agent is engaged in a call, a neighboring agent speech may be picked up by the primary agent's microphone. Contact centers using automated speech recognition systems may monitor the agent's speech for key terms and, if detected, respond accordingly. Determining a primary agent spoke a key term, when the true speaker of the key term is a neighboring agent, may cause errors or other problems. Characterizing at least the primary agent's voice and then, once a key term is detected, determining if it was the primary agent that spoke the key term, may help to reduce the errors. Additionally, computational requirements may be reduced as non-key terms may be quickly discarded and optionally, key terms determined to not have been spoke by the primary agent, may also be discarded without further processing.

20 Claims, 4 Drawing Sheets

(56) References Cited

OTHER PUBLICATIONS

"Voice Sync channel node", Houdini 9.5, Jul. 12, 2013, 5 pages, retrieved from http://www.sidefx.com/docs/houdini9.5/nodes/chop/voicesync.

"A novel voice activity detection based on phoneme recognition using statistical model", Bao and Zhu, Jan. 9, 2012, 10 pages, retrieved from http://link.springer.com/article/10.1186%2F1687-4722-2012-1#.

* cited by examiner

SPEECH ANALYTICS WITH ADAPTIVE FILTERING

FIELD OF THE DISCLOSURE

The present disclosure is generally directed toward communication systems and, more specifically, towards identifying speakers.

BACKGROUND

Speech analytics is a group of methods often employed to automatically find keywords and/or phrases in telephone conversations. The finding of keywords and phrases is intended to provide useful information regarding speech content. Content may include topics, emotions, hold and periods of silence, and business intelligence. Speech analytics, such as Avaya Speech Analytics (ASA), are designed to improve accuracy of speech processing by mapping a form against phonemes. Other speech analytics may search frame by frame to match sounds and vectors.

In many contact centers, agents work in close proximity to one another. While noise cancelling headsets and other technology may be used to help reduce the extraneous sounds, a primary agent's microphone may pick up the voice of a neighboring agent which may be registered as coming from the primary agent's microphone. Contact centers often use speech recognition technology to respond to certain words spoken by an agent. If an agent's microphone picks up a keyword that was actually spoke by a neighboring agent, the system may respond erroneously.

SUMMARY

It is with respect to the above issues and other problems that the embodiments presented herein were contemplated.

In one embodiment, the determination that a primary agent is the speaker of a keyword, phrase, and/or phoneme, also known as a "hit" or "key term" is determined. In another embodiment, the determination that the primary agent is not the speaker of the key term is made. In yet another embodiment, the determination is made as to which agent, of at least a primary agent and a secondary agent, spoke a key term. In another embodiment, the system is operable to listen to, and characterize, the speech of the primary agent, and in another embodiment, the system may characterize one or more secondary agents thereby minimizing the likelihood of assigning false hits.

In another embodiment, rather than separating or filtering through an entire conversation, each potential hit can be confirmed as coming from the primary agent and counted as a hit, not a hit, and/or confirmed as coming from one of the secondary agents. The system may also invoke a process to adaptively remove or discount ambient and/or secondary agent noise.

Conventional large vocabulary speech recognition systems identify sounds in a first step and convert them into mathematical form. In a second step, the system searches for these sounds frame by frame looking for matching word patterns. In contrast, and in accord with certain embodiments disclosed herein, sound is converted into a mathematical form in a first step, then a search is made for phonemes in a second step. An associated score is provided in a third step. As a benefit, the accuracy of speech processing may be improved as prior art speech analytics systems did not know who was talking and just searched for keywords, phrases, and/or phonemes.

Another benefit of the system utilizing certain embodiments disclosed herein provides for a primary agent's voice to be characterized and thus a "hit" is only declared if the system determines that the primary agent actually spoke the key term. Alternatively, if the key term is determined to not be a hit, with respect to the primary agent, the key term can be discounted whereby further processing, such as determining if and how to respond to the hit, is omitted. Alternatively or additionally, if the key term is determined to not be a hit with respect to the primary agent, the hit may be further processed as spoke by a secondary agent or, by a party other than the primary agent; all without filtering the audio. In another embodiment, prior to declaring a hit, the system may be configured to perform speaker identification and separation, using the prior knowledge of the agent's speech, and optionally, of the agent's nearby partners to help with the separation and speaker identification (e.g., delineation of whether the detected speech has come from the primary agent or the agent's neighbors).

In another embodiment, determining the speaker's identity is performed with speaker characterization from the audio channel, and optional existing metadata. When a possible hit is determined, the system may then run a check to see if the speaker appears to be the primary agent. In a further embodiment, the system will also access characterization of the neighboring agents and, from their previous call characterizations, the system will be able to better discern if the hit was from the primary agent or from a neighboring agent. The system may be augmented to determine all agent names/identification (e.g., extension of telephone) for agents who sit in proximity to the primary agent. The output from the index data and the output from the matches' returned (e.g., confidence, start time offset, end time offset, channel id, phrase found probability) may trigger the activation of filtering of a specific time slice on a specific channel.

In one embodiment, the system will use characterization of only the primary agent's voice, and optionally incorporate 'generic models' for all background noise. In another embodiment, the system may use recordings from adjacent phones or agent conversations to enhance the media stream of the primary agent by using adaptive filtering noise reduction techniques. In a third embodiment, the system may attempt to increase the probabilistic detection of phonemes only when it is deemed that it could impact the overall phrase detection.

In an additional embodiment, the system may detect ambient noise prior to primary and/or secondary agent voice characterization. An open channel on a telephone or a non-operational side-call between two telephones in the contact center could be used to record and determine ambient noise level (e.g., external air-conditioning unit).

In a first embodiment, a method is disclosed, comprising: characterizing a number of primary voice attributes of a primary agent; accessing a voice portion of a communication between the primary agent and a customer; monitoring the voice portion for a key term; detecting the key term in the monitored voice portion and in response to detecting the key term, characterizing a number of term attributes for the key term; determining that the number of term attributes for the key term substantially matches the number of primary voice attributes; and upon determining the number of term attributes for the key term substantially matches the number of primary voice attributes, assigning the key term speaker to be the primary agent.

In a second embodiment, a system is disclosed, comprising: a processor; a data repository; and a communication network; and wherein the processor is operable to characterize a number of primary voice attributes of a primary agent, access a voice portion of a communication between the primary agent and a customer, monitor the voice portion for a key term, detect the key term in the monitored voice portion and in response to detecting the key term characterize a number of term attributes for the key term, determine that the number of term attributes for the key term substantially matches the number of primary voice attributes and upon determining the number of term attributes for the key term substantially matches the number of primary voice attributes, and assigning the key term speaker to be the primary agent.

In a third embodiment, a non-transitory memory with instructions stored thereon that when read by a computer cause the computer to perform: characterizing a number of primary voice attributes of a primary agent; accessing a voice portion of a communication between the primary agent and a customer; monitoring the voice portion for a key term; detecting the key term in the monitored voice portion and in response to detecting the key term, characterizing a number of term attributes for the key term; determining that the number of term attributes for the key term substantially matches the number of primary voice attributes; and upon determining the number of term attributes for the key term substantially matches the number of primary voice attributes, assigning the key term speaker to be the primary agent.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedent.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
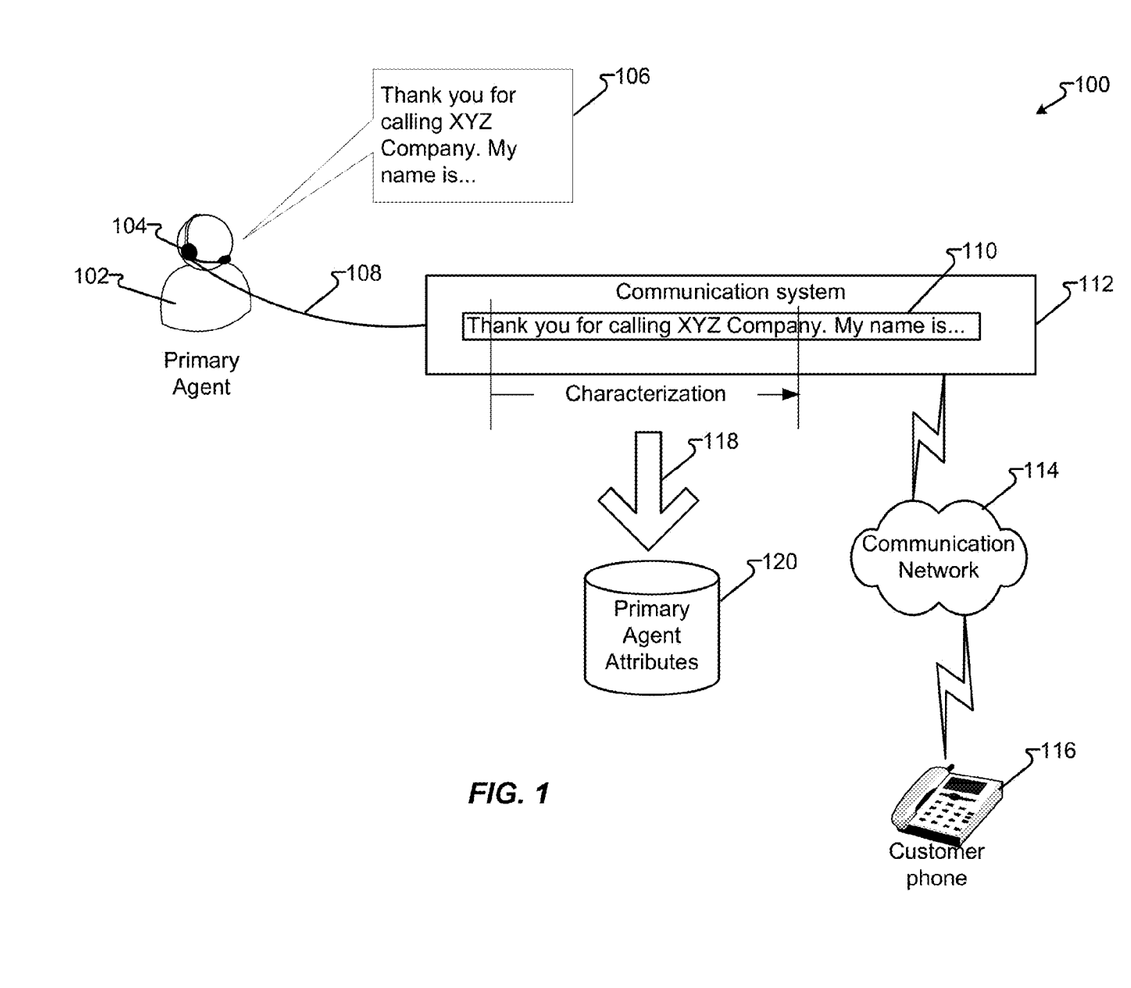
FIG. 1 depicts a first contact center diagram in accordance with embodiments of the present disclosure.

With reference now to FIG. 1, first contact center diagram 100 will be described for characterizing an agent's voice in accordance with embodiments of the present disclosure. It should be appreciated that while the examples are described in connection with a contact center implementation, the present disclosure is not so limited. Instead, embodiments of the present disclosure can be utilized in any speech analytics system. Only a portion of the well-known communications equipment used in a contact center is illustrated herein to avoid unnecessarily complicating the figures. One of ordinary skill in the art would appreciate the addition of the equipment needed to render a contact center operational.

Communication system 112 is operable to connect with communication network 114 and, therewith, customer phone 116. Examples of the communication network 114 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 114 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 114 may comprise a number of different communication media such as coaxial cable, copper cable/wire, fiber-optic cable, antennas for transmitting/receiving wireless messages, and combinations thereof. Communication system 112 is embodied such that communication on communication network 114 is enabled.

Similarly, customer phone 116 may be embodied as a POTS connected telephone, cellular telephone, VoIP phone, computer, tablet, or other device operable to facilitate voice communications via communication network 114.

In one embodiment, primary agent 102 is speaking and a microphone on headset 104 detects sound (e.g., sound waves created by primary agent 102) and converts the sound waves into an electrical signal propagated on line 108. Line 108 connects directly or with intervening equipment (not shown) to communications system 112. Communication system 112 incorporates connectivity hardware and software to facilitate communication connectivity between primary agent 102 and communications network 114. Communications system 112 may incorporate signal processing hardware and/or software, such as analog-to-digital converters, filters, compression routines, and other components as is known in the art to facilitate communicative connectivity between agent 102 and communications network 112. In addition to the well known components, additional hardware and/or software is provided by the embodiments herein.

In one embodiment, portion 110 conceptually illustrates the electrical signal on line 108 generated by, at least, a microphone on headset 104 when primary agent 102 spoke phrase 106. It should be noted that the text of portion 110, is written left-to-right, as a convention of all English writings, and does not imply a reversal of the order in which signals from portion 110 are processed. Continuing the embodiment, in a quiet environment (e.g., an environment having no or very limited background noise), the signal on line 108 is substantially that of the voice of primary agent 102; however, environments are often not suitably quiet and primary agent 102 may not be the only speaker detected by the microphone on headset 104. As can be appreciated by one of ordinary skill in the art, one or more wired portions of line 108 may be embodied as wireless portions (e.g., Bluetooth connections, WiFi connections, etc.), and associated transmitting and receiving equipment, without departing from the embodiments disclosed herein. In yet another embodiment, a recording device may be substituted for primary agent 102 such that the signal on wire 108 is not of a live agent but the playback of a recording of primary agent 102.

As primary agent 102 speaks, characterization process 118 determines tone, pitch, pace, volume and/or other attributes associated with primary agent's 102 voice. Attribute storage 120 then maintains the characterization attribute to be accessible for later processing. Characterization process 118 may be performed on a raw analog or digital signal, such as that on wire 108 and or a signal that has been subject to one or more of digitization, filtering, and/or compression utilized for other processes, such as to prepare the signal for transport via communications network 114. In a further embodiment, analysis of a key term, as discussed more fully with respect to FIGS. 2-4 may be performed on a signal in a state corresponding to a similar state of a characterization signal. For example, characterization 118 may be performed on a signal in an analog state and analysis performed on a signal in a similar analog state. In another example, characterization 118 may occur on a signal in digitized, filtered, and comprised state to correspond to later analysis on digitized, filtered, and compressed signals. In other embodiments, the state of a signal used for characterization 118 may differ from the state of a signal used for analysis. For example, an off-site analysis component may only have access the signal in the form presented to communications network 114, however, characterization may be performed on a less-processed signal or even a raw analog signal as equipment and/or business practices may dictate.

In another embodiment characterization 118 occurs upon, or substantially concurrent with, the determination that primary agent 102 spoke one or more keywords. For example, primary agent 102 may be instructed to answer incoming calls with certain words (e.g., "Thank you for calling XYZ company."). As a benefit, characterization 118 may be more accurate as opposed to the characterization occurring over inconsistent words. In a further benefit, audio filtering may be selected in accord with the background noise observed during characterization 118. In another embodiment, characterization may occur substantially upon commencement of a communication with a customer.

In yet another embodiment, characterization 118 may occur periodically during a call. For example, the level of background noise may change (e.g., a neighboring agent begins or ends a shift, an air conditioner unit turns on or off, etc.); however, as primary agent 102 is closest to the microphone of headset 104, it may be assumed that the loudest signal on line 108 is most likely that of the voice of primary agent 102. Therefore, one or more in-progress characterizations may occur to establish or update the characterization attributes in attribute storage 120.

With primary agent 102 having voice characterization performed and stored in attribute storage 120, the speaker of a detected key term may be determined.

Figure 2:
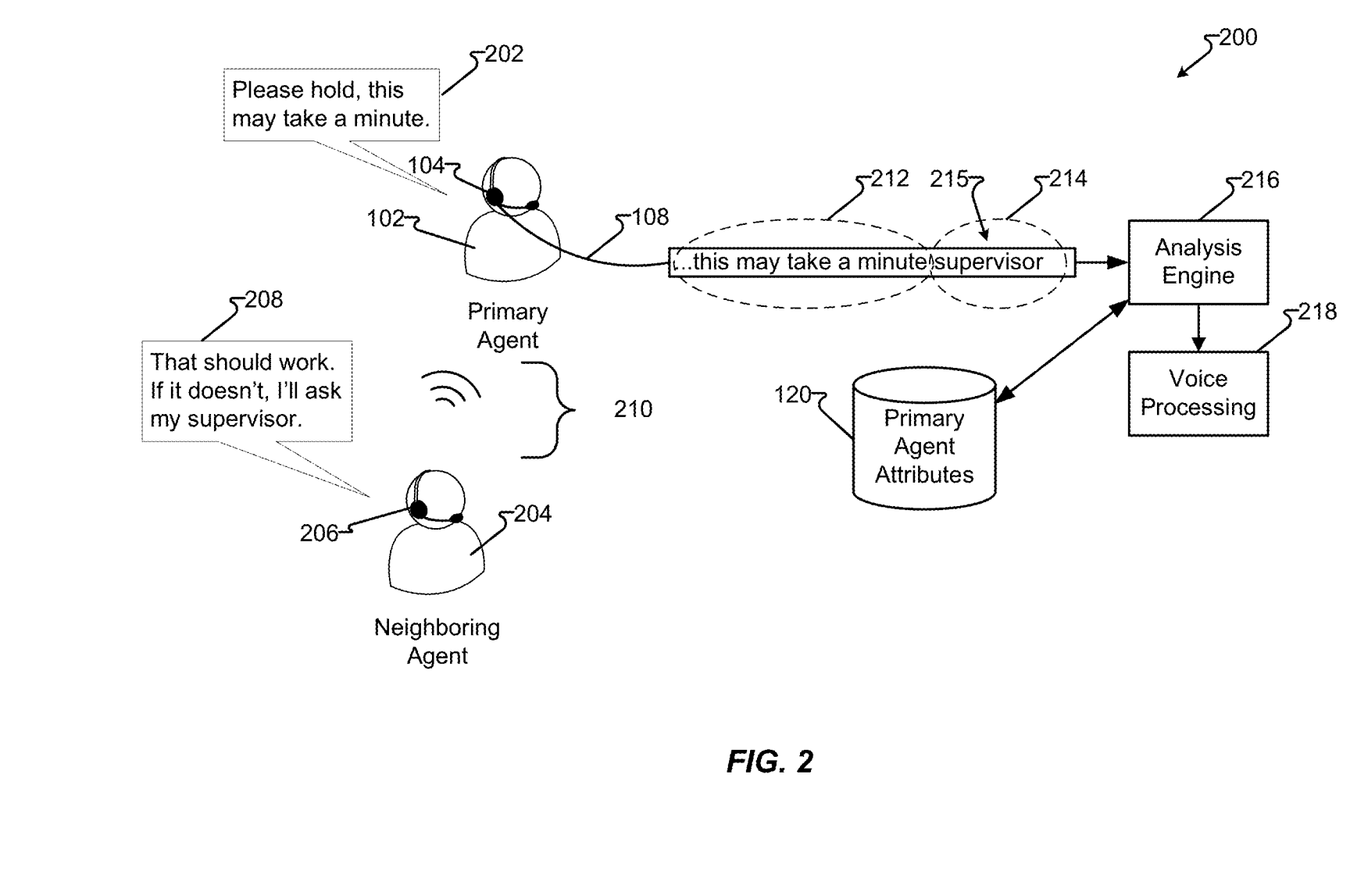
FIG. 2 depicts a second contact center diagram in accordance with embodiments of the present disclosure.

With reference now to FIG. 2, second contact center diagram 200 will be described for determining the speaker of a key term in accordance with embodiments of the present disclosure. In one embodiment primary agent 102 is physically situated close to a source of background noise, such as neighboring agent 204. Neighboring agent 204 speaks words 208 intended to be received by a microphone on headset 206 and conveyed to another party. However, sound 210 from neighboring agent 204 is picked up by the microphone of headset 104.

Commonly, while primary agent 102 is speaking, the signal on line 108 will be dominated by the larger amplitude signal of primary agent 102. Other signals may be distinguished by their lower amplitude and readily ignored by a human listener, and/or filtered-out by automated systems. However, a pause or even the gaps between words may allow sound 210 to be picked up as if it were the voice of primary agent 102. In one embodiment, line 108 includes signals from the words 202 spoke by primary agent 102. However, as primary agent 102 pauses, one of words 208 spoke by neighboring agent 204 was picked up, specifically key term 215. As a result the signal on line 108 includes a first portion 212, spoke by primary agent 102, and a second portion 214 spoke by secondary agent 206. Analysis engine 216 may then be employed to monitor line 108 and the signals thereon. As referenced with respect to FIG. 1, analysis engine 216 may process first portion 212 and second portion 214 as a digital signals, such as from primary agent 102's telephone or other communication device, or as a processed signal, whereby one or more of compression, filtering, and digitization has occurred. Furthermore, analysis engine 216 may determine the speaker of key term 214 and cause voice processing 218 to respond accordingly. In a further embodiment, analysis engine 216 may be co-located with primary agent 102 and/or other telephony and/or contact center equipment or offsite, without departing from the embodiments described herein.

In one embodiment, analysis engine 216 processes first portion 212 and discards all words, which may include sounds, single words, multiple words, phrases, phonemes, etc. that are either expressly identified as not key terms or absent in a repository having only key terms. As a benefit, non-key terms may be quickly discarded with minimal processing and thereby minimize the computational burden on the contact center. Next, analysis engine 216 analyzes second portion 214 and detects the presence of key term 215.

Analysis engine 216 then determines the identity of the speaker of key term 215. In one embodiment, primary agent attribute storage 210 is accessed and attributes, such as from the characterization of primary agent 102 by characterization 118, are retrieved. A set of key term attributes is also determined for key term 215 and then compared to the attributes of primary agent 102. If the attributes match, or match within a certain margin of error, analysis engine 216 may then determine that it was primary agent 102 who spoke key term 215. In response, voice processing 218 may be signaled and a previously determined action may then be taken in response to primary agent 102 speaking key term 215.

The occurrence of any one or more key terms may be signal for another action. The action may be as simple, such as incrementing a tally of occurrences. For example, a contact center supporting an electronic component vendor may want to know if agents are promoting the sale of cables and, therefore, track occurrences of the word, "cable." In other examples, the contact center may respond to certain key terms. For example, if an agent speaks the word, "supervisor" the agent's supervisor may be signaled and, if available, the supervisor may then join the call, such as in a listen-only mode. As a benefit, if the agent then makes a request for the supervisor to join the call, the supervisor may fully join the call and have at least some context for the call, such as knowing the customer is angry, frustrated, confused, etc. Other key terms may be used for quality control purposes, such as to detect the agent's use of profanity, insults, or demeaning language or the use of certain positive key words or the delivery of a catch-phrase.

In another embodiment, analysis engine 216 may determine primary agent 102 did not speak key term 215 and perform additional processing. As discussed above, the determination that primary agent 102 did not speak key term 215 may be sufficient and no further processing required, such as when the true speaker of key term 215 is separately monitored by analysis engine 216.

However, in certain embodiments two or more agents may simultaneously be engaged with the same client. Therefore, analysis engine 216 may determine if a key term was spoke by one of the agents and, if so, which one. Accordingly, voice characterization is performed such that voice attributes are made available for comparison to attributes of the key term. If a match, or a sufficient match, between the attributes of the key term and one of the agents, the speaker of the key term is assigned accordingly. Generally, a customer's voice is readily distinguishable as being on a separate line from the associated agent. However, as can be appreciated the embodiments herein may be applied to embodiments where the customer and agent share the same voice input device, such as a microphone at a kiosk. A plurality of agents, simultaneously engaged with a customer, is discussed more fully with respect to FIG. 3.

In yet another embodiment, analysis engine 216 may assign the speaker of a key term based upon a context of the key term within the communication. For example, if primary agent 102 is engaged in a communication with a customer and several minutes into the communication the key term, "Thank you for calling XYZ Company," is detected. The key term may have an associated context, such as a time context which normally occurs within the first seconds of the call, and accordingly analysis engine 216 may determine the speaker is likely not primary agent 102.

In still yet another embodiment, analysis engine 216 may characterize a key term that is out of context for a specific communication. Continuing the example, a greeting may be a key term, such as, "thank you for calling XYZ company," and be out of context for a communication that has been underway for a length of time. Therefore, the speaker of the key term may be characterized and attributes created and associated with a speaker who may be specifically identified (e.g., neighboring agent 204) and/or identified as a party who is not primary agent 102.

Figure 3:
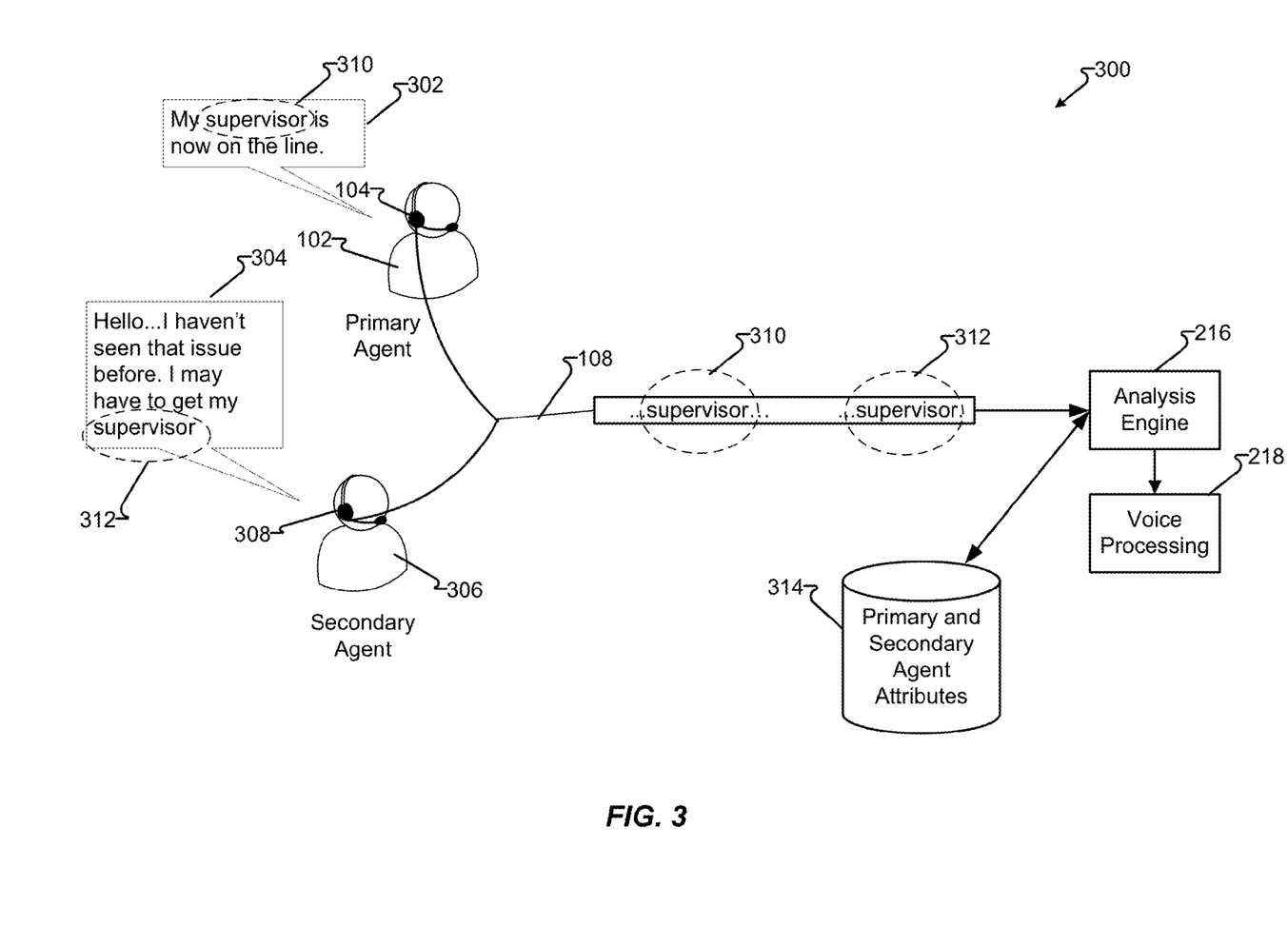
FIG. 3 depicts a third second contact center diagram in accordance with embodiments of the present disclosure.

With reference now to FIG. 3, third contact center diagram 300 will be described in accordance with embodiments of the present disclosure. In one embodiment, primary agent 102 is engaged in a call with a customer along with secondary agent 306, who in turn is using headset 308 with an integrated microphone. For example, a telephone device used by primary agent 102 may have at least two jacks and secondary agent 306 then plugs headset 308 into one of the jacks. Unlike a conference call where each party uses their own telephone (or telephonic device) on a separate line, the downstream telephony equipment may be unable to determine that multiple agents are engaged in the same call. In another embodiment, both primary agent 102 and secondary agent 306 are sharing a common microphone as the sole input into line 108 (e.g., kiosk). Primary agent 102 speaks dialog 302, including first key term 310 and, such as at a later time, secondary agent 306 speaks dialog 304, including second key term 312.

Primary agent 302 may use first key term 310, such as the word, "supervisor" and as illustrated with respect to FIG. 2, analysis engine 216 characterizes first key term 310, compares the characterized first key term 310 to attributes in primary and secondary agent attributes database 314, and concludes primary agent 102 spoke first key term 310. Voice processing 218 may conclude that no action is to be taken as the supervisor, such as secondary agent 306, is already engaged in the call. If voice processing 218 is unaware of the presence of secondary agent 306, secondary agent 306, if signaled to join the call, may simply ignore the signal.

In another embodiment, secondary agent 306 speaks second key term 312. Analysis engine 216 accesses primary and secondary agent attribute database 314 containing previously characterized attributes for secondary agent 306, and if the characterized key term 312 matches characterized the voice of secondary agent 306, conclude secondary agent 306 spoke second key term 312. Accordingly, analysis engine 216 may then signal voice processing 218 that secondary agent 306 may be requesting his or her supervisor to join the call and voice processing 218 may then respond accordingly.

Figure 4:
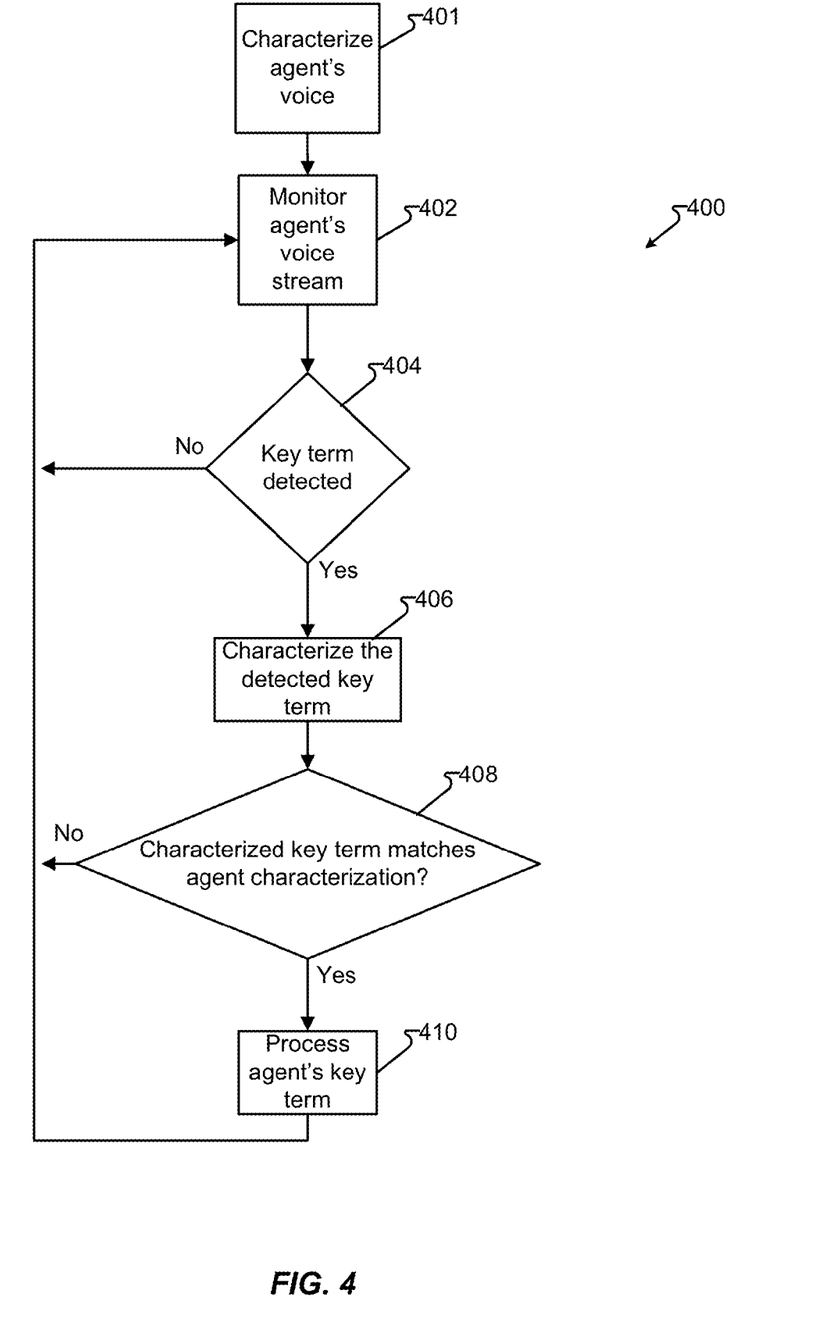
FIG. 4 depicts a process in accordance with embodiments of the present disclosure.

With reference now to FIG. 4, process 400 will be described in accordance with embodiments of the present disclosure. In one embodiment, process 400 begins and step 401 characterizes the voice of an agent, such as primary agent 102. Step 402 monitors the agent's voice stream, such as by analysis engine 216 monitoring line 108 associated with primary agent 102. Step 404 determines if a key term has been detected on the monitored line 108. If the query of step 404 is answered negatively, processing may then continue back at step 402. If the query of step 404 is answered positively, the method 400 continues with step 406 characterizing the detected key term. Step 408 then determines if the characterized key term and characterized agent voice match one another, within a previously determined margin of error. If the query of step 408 is answered negatively, processing may continue back at step 402. If the query of step 408 is answered positively, processing may continue to step 410 where the key term spoken by the primary agent is processed in accordance with rules defined for the detection of such a key term.

Step 401 may characterize the agent's voice passively, that is, the agent speaks to communicate with another party and not specifically for voice characterization. In another embodiment, step 401 may comprise an active agent characterization step, for example, the agent may receive instructions to speak a word or set of words during a time the primary agent is not engaged with a customer for the purpose of voice characterization. In other embodiments, the characterization of the primary agent's voice occurs as the agent begins a call with a customer and/or periodically during a call.

In another embodiment, step 408, upon determining the characterized key term does not match the primary agent, determines if the characterized key term matches the characterized voice of another agent, such as neighboring agent 204. If so, processing may resume back at step 402, and thereby discarding the key term from further processing, or if the primary agent and neighboring agent are engaged in the same call with the customer, processing may continue in accord with the neighboring agent as the speaker of the key term.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    characterizing, by a processor, a number of primary voice attributes of a primary agent;
    accessing, by the processor, a voice portion of a communication between the primary agent and a customer on a communications network;
    monitoring the voice portion of the communication for a key term;
    associating, by the processor, the key term with an expected time context;
    determining, by the processor, an actual time context of the key term within the communication;
    detecting, by the processor, the key term in the monitored voice portion;
    in response to detecting the key term, characterizing a number of term attributes for the key term; and
    the processor, upon determining (a) that the number of term attributes for the key term substantially matches the number of primary voice attributes and (b) that the actual time context and the expected time context substantially agree, assigning the key term speaker to be the primary agent.

2. The method of claim 1, further comprising:
the processor, upon determining the number of term attributes for the key term substantially differs from the number of primary voice attributes
assigns the key term speaker to be the primary agent.

3. The method of claim 1, further comprising:
characterizing, by the processor a number of secondary voice attributes of a secondary agent;
determining that the number of term attributes for the key term substantially matches the number of secondary voice attributes; and
upon determining the number of term attributes for the key term substantially matches the number of secondary voice attributes, the processor assigns the key term speaker to be the secondary agent.

4. The method of claim 3, wherein a microphone proximate to the primary agent receives the voice of the secondary agent.

5. The method of claim 3, wherein the primary agent and the secondary agent are engaged in the communication.

6. The method of claim 3, further comprising:
associating, by the processor, the key term with an expected time context;
determining, by the processor, an actual time context of the key term within the communication;
determining, by the processor, the number of term attributes for the key term fails to substantially match the number of primary voice attributes;
determining, by the processor, the number of term attributes for the key term substantially differ from the number of secondary voice attributes; and
upon determining, by the processor, the actual time context and the expected time context substantially do not agree, assigning, by the processor, the key term speaker to be the secondary agent.

7. The method of claim 1, wherein at least one of the term attributes and primary voice attributes comprises at least one of tone, pitch, pace, and volume.

8. The method of claim 1, further comprising:
assigning, by the processor, an action to perform upon the primary agent speaking the key term; and
upon assigning the key term speaker to be the primary agent, performing the action.

9. The method of claim 1, wherein the characterizing of the number of primary voice attributes of the primary agent begins substantially upon the primary agent accepting the communication.

10. A system, comprising:
a processor;
a data repository coupled to the processor; and
a communications network coupled to the processor; and
wherein the processor is programmed to characterize a number of primary voice attributes of a primary agent, access a voice portion of a communication between the primary agent and a customer on the communications network, monitor the voice portion of the communication for a key term, associate the key term with an expected time context, determine an actual time context of the key term within the communication, detect the key term in the monitored voice portion, in response to detecting the key term, characterize a number of term attributes for the key term, and, upon determining (a) that the number of term attributes for the key term substantially matches the number of primary voice attributes and (b)) that the actual time context and the expected time context substantially agree assign the key term speaker to be the primary agent.

11. The system of claim 10, wherein the processor is further operable to:
characterize a number of secondary voice attributes of a secondary agent;
determining that the number of term attributes for the key term substantially matches the number of secondary voice attributes; and
upon determining the number of term attributes for the key term substantially matches the number of secondary voice attributes, assigning the key term speaker to be the secondary agent.

12. The system of claim 11, further comprising:
a microphone proximate to the primary agent and operable to receive the voice of the secondary agent.

13. The system of claim 11, wherein the primary agent and the secondary agent are each nodes on the communication network and the primary agent and the secondary agent are engaged in the communication.

14. A non-transitory memory with instructions stored thereon that when read by a computer cause the computer to perform:
characterizing, by the processor, a number of primary voice attributes of a primary agent;
accessing, by the processor, a voice portion of a communication between the primary agent and a customer;
monitoring, by the processor, the voice portion for a key term;
associating, by the processor, the key term with an expected time context;
determining, by the processor, an actual time context of the key term within the communication;
detecting, by the processor, the key term in the monitored voice portion;
in response to detecting the key term, characterizing a number of term attributes for the key term;
determining, by the processor, that the number of term attributes for the key term substantially matches the number of primary voice attributes; and
the processor, upon determining (a) that the number of term attributes for the key term substantially matches the number of primary voice attributes and (b) that the actual time context and the expected time context substantially agree, assigning the key term speaker to be the primary agent.

15. The instructions of claim 14 being further operable to cause the computer to further perform:
the processor, upon determining the number of term attributes for the key term substantially differs from the number of primary voice attributes
assigning the key term speaker to be the primary agent.

16. The instructions of claim 14 being further operable to cause the computer to further perform:
characterizing, by the processor, a number of secondary voice attributes of a secondary agent;
determining, by the processor, that the number of term attributes for the key term substantially matches the number of secondary voice attributes; and
upon determining the number of term attributes for the key term substantially matches the number of secondary voice attributes, assigning, by the processor, the key term speaker to be the secondary agent.

17. The instructions of claim 16, wherein a microphone proximate to the primary agent receives the voice of the secondary agent.

18. The instructions of claim 16, wherein the primary agent and the secondary agent are engaged in the communication.

19. The instructions of claim 16 being further operable to cause the computer to further perform:

associating, by the processor, the key term with an expected time context;

determining, by the processor, an actual time context of the key term within the communication;

determining, by the processor, the number of term attributes for the key term fails to substantially match the number of primary voice attributes;

determining, by the processor, the number of term attributes for the key term substantially differ from the number of secondary voice attributes; and upon determining the actual time context and the expected time context substantially do not agree, assigning, by the processor, the key term speaker to be the secondary agent.

20. The instructions of claim 14 being further operable to cause the computer to further perform:

assigning, by the processor, an action to perform upon the primary agent speaking the key term; and upon assigning the key term speaker to be the primary agent, performing the action.

* * * * *